（12）United States Patent
Konuma et al.

(10) Patent No.: US 9,767,795 B2
(45) Date of Patent: Sep. 19, 2017

(54) SPEECH RECOGNITION PROCESSING DEVICE, SPEECH RECOGNITION PROCESSING METHOD AND DISPLAY DEVICE

(71) Applicant: Panasonic Intellectual Property Management Co., Ltd., Osaka (JP)

(72) Inventors: Tomohiro Konuma, Osaka (JP); Tomohiro Koganei, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/023,384

(22) PCT Filed: Dec. 25, 2014

(86) PCT No.: PCT/JP2014/006449
§ 371 (c)(1),
(2) Date: Mar. 19, 2016

(87) PCT Pub. No.: WO2015/098109
PCT Pub. Date: Jul. 2, 2015

(65) Prior Publication Data
US 2016/0217783 A1 Jul. 28, 2016

(30) Foreign Application Priority Data
Dec. 26, 2013 (JP) ................. 2013-268670

(51) Int. Cl.
*G10L 15/02* (2006.01)
*G10L 15/18* (2013.01)
(Continued)

(52) U.S. Cl.
CPC .......... *G10L 15/1822* (2013.01); *G10L 15/22* (2013.01); *G10L 17/06* (2013.01);
(Continued)

(58) Field of Classification Search
CPC ...... G10L 15/08; G10L 15/18; G10L 15/1822; G10L 15/22; G10L 15/221; G10L 15/222;
(Continued)

(56) References Cited

U.S. PATENT DOCUMENTS 6,308,152 B1 10/2001 Konuma et al.
6,718,307 B1 4/2004 Buil et al.
(Continued)

FOREIGN PATENT DOCUMENTS

EP 1562178 8/2005
JP 7-077998 3/1995
(Continued)

OTHER PUBLICATIONS

The Extended European Search Report dated Oct. 4, 2016 for the related European Patent Application No. 14875013.6.
(Continued)

*Primary Examiner* — Marivelisse Santiago Cordero
*Assistant Examiner* — Stephen Brinich
(74) *Attorney, Agent, or Firm* — McDermott Will & Emery LLP

(57) ABSTRACT

The voice recognition processing apparatus includes a voice acquirer, a first voice recognizer, a storage device, and a recognition result determiner. The voice acquirer acquires a user's voice, and outputs voice information. The first voice recognizer converts the voice information into first information. The storage device previously stores a dictionary in which an exclusion vocabulary is registered. The recognition result determiner compares the first information with the exclusion vocabulary to determine whether the first information includes a word that agrees with a word included in the exclusion vocabulary. The recognition result determiner determines that the first information is information to be rejected, when the first information includes the
(Continued)

word that agrees with a word included in the exclusion vocabulary, and determines that the first information is information to be executed, when the first information does not include the word that agrees with a word included in the exclusion vocabulary.

6 Claims, 8 Drawing Sheets

(51) Int. Cl.
*G10L 15/22* (2006.01)
*G10L 17/06* (2013.01)
*G10L 25/78* (2013.01)
*G10L 15/32* (2013.01)

(52) U.S. Cl.
CPC .............. *G10L 15/32* (2013.01); *G10L 25/78* (2013.01); *G10L 2015/223* (2013.01); *G10L 2025/783* (2013.01)

(58) Field of Classification Search
CPC ... G10L 15/223; G10L 15/225; G10L 15/226; G10L 15/227; G10L 15/228; G10L 15/24; G10L 15/26; G10L 17/00; G10L 17/06; G10L 17/08; G10L 17/14
USPC ........................ 704/1–10, 246–250, 208, 214
See application file for complete search history.

(56) References Cited

U.S. PATENT DOCUMENTS

| | | | |
|---|---|---|---|
| 2007/0133757 A1* | 6/2007 | Girouard | H04M 3/436 379/67.1 |
| 2008/0059186 A1 | 3/2008 | Mowatt et al. | |
| 2008/0120107 A1 | 5/2008 | Harada | |
| 2013/0018895 A1 | 1/2013 | Harless et al. | |

FOREIGN PATENT DOCUMENTS

| | | |
|---|---|---|
| JP | 11-311994 | 11/1999 |
| JP | 2000-020089 | 1/2000 |
| JP | 2005-227686 | 8/2005 |
| JP | 2010-085536 | 4/2010 |
| JP | 2010-103751 | 5/2010 |
| JP | 2011-170274 | 9/2011 |
| JP | 4812941 B | 11/2011 |

OTHER PUBLICATIONS

International Search Report of PCT application No. PCT/JP2014/006449 dated Mar. 17, 2015.

\* cited by examiner

SPEECH RECOGNITION PROCESSING DEVICE, SPEECH RECOGNITION PROCESSING METHOD AND DISPLAY DEVICE

CROSS-REFERENCE TO RELATED APPLICATIONS

This application is a U.S. national stage application of the PCT International Application No. PCT/JP2014/006449 filed on Dec. 25, 2014, which claims the benefit of foreign priority of Japanese patent application 2013-268670 filed on Dec. 26, 2013, the contents all of which are incorporated herein by reference.

TECHNICAL FIELD

The present disclosure relates to voice recognition processing apparatuses, voice recognition processing methods, and display apparatuses that operate by recognizing a voice uttered by a user.

BACKGROUND ART

Patent Literature 1 discloses a voice input apparatus that has a voice recognition function. This voice input apparatus is configured to receive a voice uttered by a user, to recognize (voice recognition) a command indicated by the voice of the user by analyzing the received voice, and to control a device in accordance with the voice-recognized command. That is, the voice input apparatus of Patent Literature 1 is capable of performing voice recognition on the voice arbitrarily uttered by the user, and controlling the device in accordance with the command that is a result of the voice recognition.

For example, a user who uses this voice input apparatus can select hypertext displayed on a browser by using the voice recognition function of this voice input apparatus while operating the browser on an apparatus such as a television receiver (hereinafter referred to as "television") and a PC (Personal Computer). In addition, the user can also use this voice recognition function to perform a search on a web site (search site) that provides a search service.

In addition, in this voice input apparatus, "triggerless recognition" may be performed in order to increase convenience of the user. "The triggerless recognition" refers to a condition in which voice collection and voice recognition of the collected voice are always performed in a voice input apparatus without limitation of a period in which voice input for voice recognition is accepted. However, if triggerless recognition is performed in this voice input apparatus, it is difficult to distinguish whether the collected voice is a voice uttered by the user for a purpose of voice recognition, and whether the collected voice is not a voice for a purpose of voice recognition, such as conversation among the users and a monologue of the user. Thus, a voice that is not for the purpose of voice recognition may be falsely recognized (false recognition).

CITATION LIST

Patent Literature

PTL 1: Japanese Patent No. 4812941

SUMMARY

The present disclosure provides a voice recognition processing apparatus and a voice recognition processing method that reduce false recognition and improve operativity of the user.

A voice recognition processing apparatus according to the present disclosure includes a voice acquirer, a first voice recognizer, a storage device, and a recognition result determiner. The voice acquirer is configured to acquire a voice uttered by a user and to output voice information. The first voice recognizer is configured to convert the voice information into first information. The storage device previously stores a dictionary in which an exclusion vocabulary is registered. The recognition result determiner compares the first information with the exclusion vocabulary to determine whether the first information includes a word that agrees with a word included in the exclusion vocabulary. Then, the recognition result determiner determines that the first information is information to be rejected, when the first information includes the word that agrees with a word included in the exclusion vocabulary, and determines that the first information is information to be executed, when the first information does not include the word that agrees with a word included in the exclusion vocabulary.

A voice recognition processing method according to the present disclosure involves: acquiring a voice uttered by a user to convert the voice into voice information; converting the voice information into first information; converting the voice information into second information; selecting one of the first information and the second information; comparing the selected information with an exclusion vocabulary registered in a dictionary to determine whether the selected information includes a word that agrees with a word included in the exclusion vocabulary; determining that the selected information is information to be rejected, when the selected information includes the word that agrees with a word included in the exclusion vocabulary; and determining that the selected information is information to be executed, when the selected information does not include the word that agrees with a word included in the exclusion vocabulary.

A display apparatus according to the present disclosure includes a voice acquirer, a first voice recognizer, a storage device, a recognition result determiner, a processor, and a display device. The voice acquirer is configured to acquire a voice uttered by a user and to output voice information. The first voice recognizer is configured to convert the voice information into first information. The storage device previously stores a dictionary in which an exclusion vocabulary is registered. The recognition result determiner compares the first information with the exclusion vocabulary to determine whether the first information includes a word that agrees with a word included in the exclusion vocabulary, and, based on the determination, to determine whether to reject or execute the first information. The processor is configured to execute processing based on the first information that is determined by the recognition result determiner to be executed. Then, the recognition result determiner determines that the first information is information to be rejected, when the first information includes the word that agrees with a word included in the exclusion vocabulary, and determines that the first information is information to be executed, when the first information does not include the word that agrees with a word included in the exclusion vocabulary.

The voice recognition processing apparatus according to the present disclosure can improve operativity when the user performs voice operation.

DESCRIPTION OF EMBODIMENTS

Exemplary embodiments will be described in detail below with reference to the drawings as needed. However, a description that is more detailed than necessary may be omitted. For example, a detailed description of an already well-known item and a repeated description of substantially identical components may be omitted. This is for avoiding the following description from becoming unnecessarily redundant and for making the description easier for a person skilled in the art to understand.

It is to be noted that the accompanying drawings and the following description are provided in order for a person skilled in the art to fully understand the present disclosure, and are not intended to limit the subject described in the appended claims.

First Exemplary Embodiment

A first exemplary embodiment will be described below with reference to FIG. 1 to FIG. 4. It is to be noted that although television receiver (television) 10 is cited in the present exemplary embodiment as an example of a display apparatus including a voice recognition processing apparatus, the display apparatus is not limited to television 10. For example, the display apparatus may be an apparatus such as a PC, a tablet terminal, and a mobile terminal.

Although voice recognition processing system 11 according to the present exemplary embodiment is configured to perform triggerless recognition, the present disclosure is not limited to triggerless recognition. The present disclosure is also applicable to a system in which voice recognition is started by an operation for starting voice recognition by user 700.

[1-1. Configuration]

Figure 1:
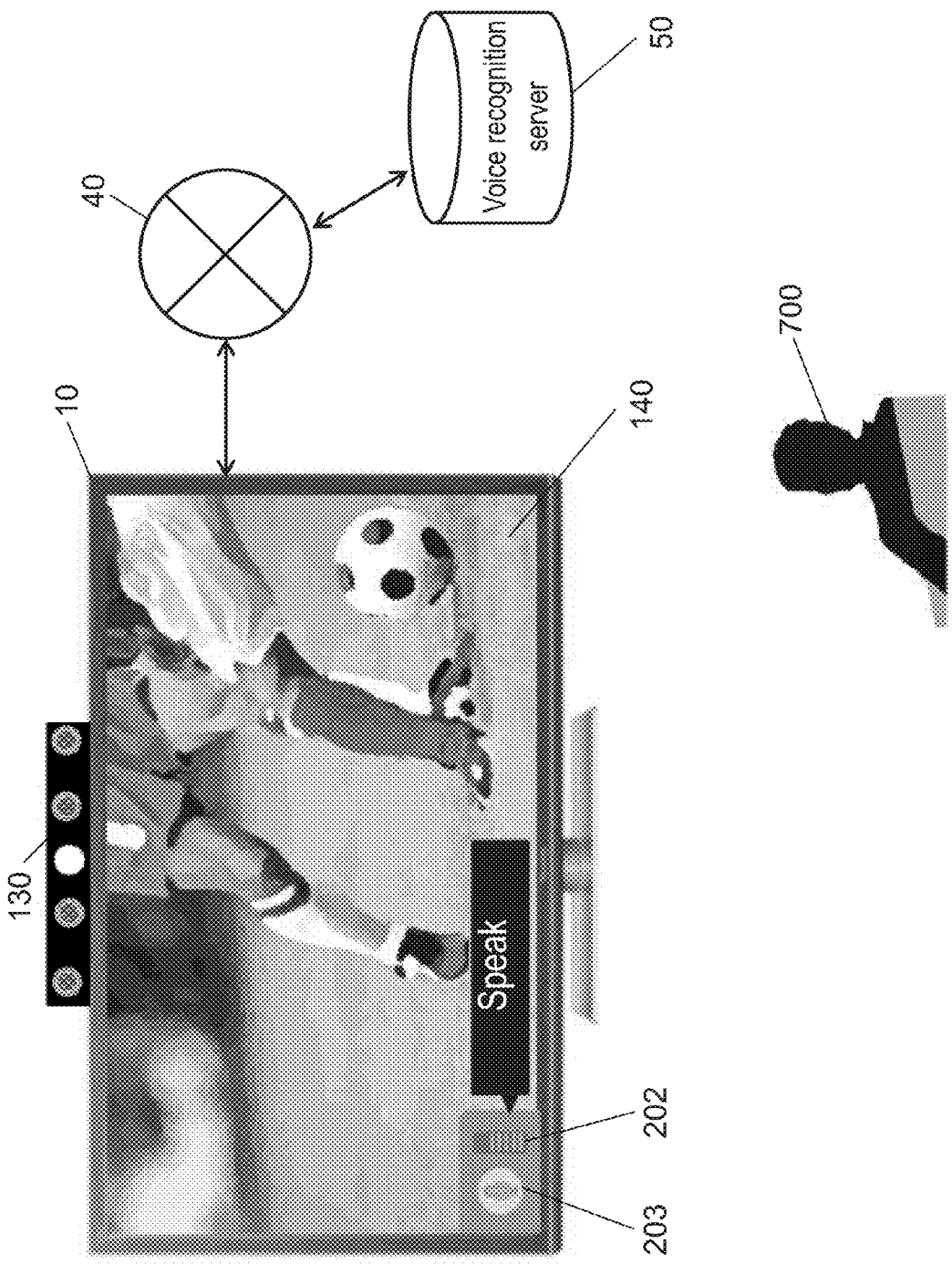
FIG. 1 is a diagram schematically illustrating a voice recognition processing system according to a first exemplary embodiment.

FIG. 1 is a diagram schematically illustrating voice recognition processing system 11 according to the first exemplary embodiment. In the present exemplary embodiment, television 10 that is an example of the display apparatus incorporates the voice recognition processing apparatus.

Voice recognition processing system 11 according to the present exemplary embodiment includes television 10 that is an example of a display apparatus, and voice recognition server 50.

When the voice recognition processing apparatus starts in television 10, voice recognition icon 203 and indicator 202 indicating volume of a collected voice are displayed on display device 140 of television 10, together with an image based on signals such as an input image signal and a received broadcast signal. This is for indicating user 700 that an operation (hereinafter referred to as "voice operation") of television 10 based on a voice of user 700 is available and for prompting user 700 to utter a voice.

When user 700 utters a voice toward built-in microphone 130 included in television 10, the voice is collected by built-in microphone 130, and the collected voice is recognized by the voice recognition processing apparatus incorporated in television 10. In television 10, control of television 10 is performed in accordance with a result of the voice recognition.

Television 10 may have a configuration that includes a remote control or mobile terminal configured such that the voice uttered by user 700 is collected by a built-in microphone and wirelessly transmitted to television 10.

In addition, television 10 is connected to voice recognition server 50 via network 40. Communication can take place between television 10 and voice recognition server 50.

Figure 2:
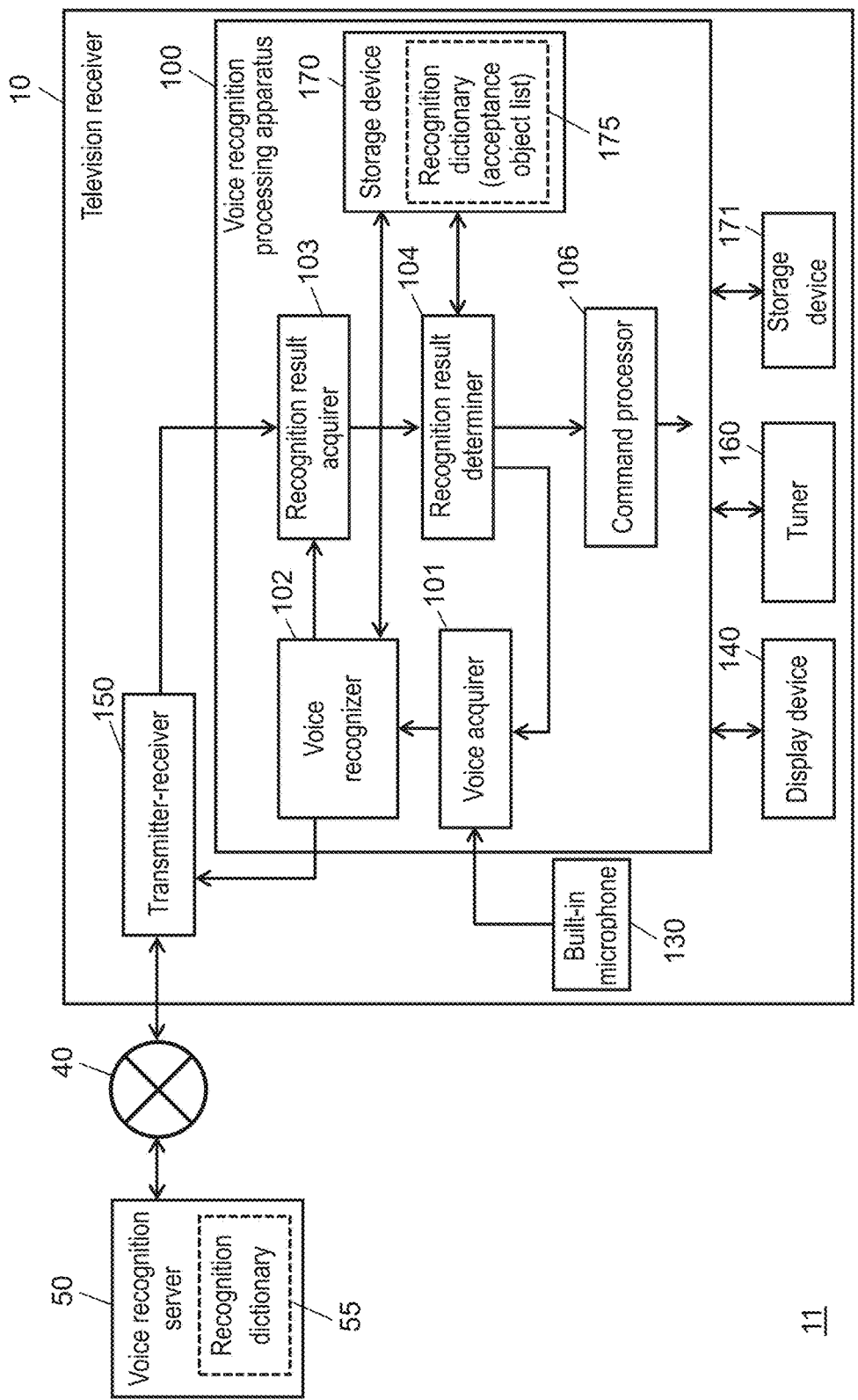
FIG. 2 is a block diagram illustrating a configuration example of the voice recognition processing system according to the first exemplary embodiment.

FIG. 2 is a block diagram illustrating a configuration example of voice recognition processing system 11 according to the first exemplary embodiment.

Television 10 includes voice recognition processing apparatus 100, display device 140, transmitter-receiver 150, tuner 160, storage device 171, and built-in microphone 130.

Voice recognition processing apparatus 100 is configured to acquire a voice uttered by user 700 and to analyze the acquired voice. Voice recognition processing apparatus 100 is configured to recognize an instruction represented by the voice and to control television 10 in accordance with a recognized result. Specific configuration of voice recognition processing apparatus 100 will be described later.

Built-in microphone 130 is a microphone configured to collect voice that mainly comes from a direction facing a display surface of display device 140. That is, a sound-collecting direction of built-in microphone 130 is set so as to collect the voice uttered by user 700 who faces display device 140 of television 10. Built-in microphone 130 can collect the voice uttered by user 700 accordingly. Built-in microphone 130 may be provided inside an enclosure of television 10, and as illustrated in an example of FIG. 1, may be installed outside the enclosure of television 10.

Display device 140, which is, for example, a liquid crystal display, may also be a display such as a plasma display and an organic EL (Electro Luminescence) display. Display device 140 is controlled by display controller (not shown), and displays an image based on signals such as an external input image signal and a broadcast signal received by tuner 160.

Transmitter-receiver 150 is connected to network 40, and is configured to communicate via network 40 with an external device (for example, voice recognition server 50) connected to network 40.

Tuner 160 is configured to receive a television broadcast signal of terrestrial broadcasting or satellite broadcasting via an antenna (not illustrated). Tuner 160 may be configured to receive the television broadcast signal transmitted via a private cable.

Storage device 171, which is, for example, a nonvolatile semiconductor memory, may be a device such as a volatile semiconductor memory and a hard disk. Storage device 171 stores information (data), a program, and the like used for control of each unit of television 10.

Network 40, which is, for example, the Internet, may be another network.

Voice recognition server 50 is an example of "a second voice recognizer". Voice recognition server 50 is a server (dictionary server on a cloud) connected to television 10 via network 40. Voice recognition server 50 includes recognition dictionary 55, and is configured to receive voice information transmitted via network 40 from television 10. Recognition dictionary 55 is a database for associating the voice information with voice recognition models. Then, voice recognition server 50 compares the received voice information with the voice recognition models in recognition dictionary 55, to confirm whether the received voice information includes voice information corresponding to the voice recognition models registered in recognition dictionary 55. When the received voice information includes the voice information corresponding to the voice recognition models registered in recognition dictionary 55, voice recognition server 50 selects a character string represented by the voice recognition models. In this way, voice recognition server 50 converts the received voice information into the character string. It is to be noted that this character string may be a plurality of characters, and may be one character. Then, voice recognition server 50 transmits character string information representing the converted character string to television 10 via network 40 as a result of voice recognition. This character string information is an example of "second information".

Voice recognition processing apparatus 100 includes voice acquirer 101, voice recognizer 102, recognition result acquirer 103, recognition result determiner 104, command processor 106, and storage device 170.

Storage device 170 is, for example, a nonvolatile semiconductor memory, and can write and read data arbitrarily. Storage device 170 may be a device such as a volatile semiconductor memory and a hard disk. Storage device 170 also stores information such as information (for example, recognition dictionary 175) that is referred to by voice recognizer 102 and recognition result determiner 104. Recognition dictionary 175 is an example of "a dictionary". Recognition dictionary 175 is a database for associating the voice information with the voice recognition models. In addition, an exclusion object list is also registered in recognition dictionary 175. Details of the exclusion object list will be described later. It is to be noted that storage device 170 and storage device 171 may be integrally formed.

Voice acquirer 101 acquires a voice signal generated by the voice uttered by user 700, converts the voice signal into the voice information, and outputs the voice information to voice recognizer 102.

Voice recognizer 102 is an example of "a first voice recognizer". Voice recognizer 102 converts the voice information into the character string information, and outputs the character string information to recognition result acquirer 103 as a result of voice recognition. This character string information is an example of "first information". In addition, voice recognizer 102 transmits the voice information acquired from voice acquirer 101, from transmitter-receiver 150 via network 40 to voice recognition server 50.

Voice recognition server 50 recognizes the voice information received from television 10 with reference to recognition dictionary 55, and replies a result of voice recognition to television 10.

Recognition result acquirer 103 is an example of "a selector". On receipt of the result (the first information) of voice recognition that is output from voice recognizer 102, and the result (the second information) of voice recognition replied from voice recognition server 50, recognition result acquirer 103 compares the first information with the second information to select either one. Then, recognition result acquirer 103 outputs the selected one to recognition result determiner 104.

Recognition result determiner 104 determines whether to reject or execute (accept) the result of voice recognition that is output from recognition result acquirer 103. Details of this determination will be described later. Then, based on the determination, recognition result determiner 104 outputs the result of voice recognition to command processor 106 or voice acquirer 101.

Based on the output (the result of voice recognition that is determined to be executed) from recognition result determiner 104, command processor 106 performs command processing (for example, control of television 10). Command processor 106 is an example of "a processor", and this command processing is an example of "processing".

Figure 3:
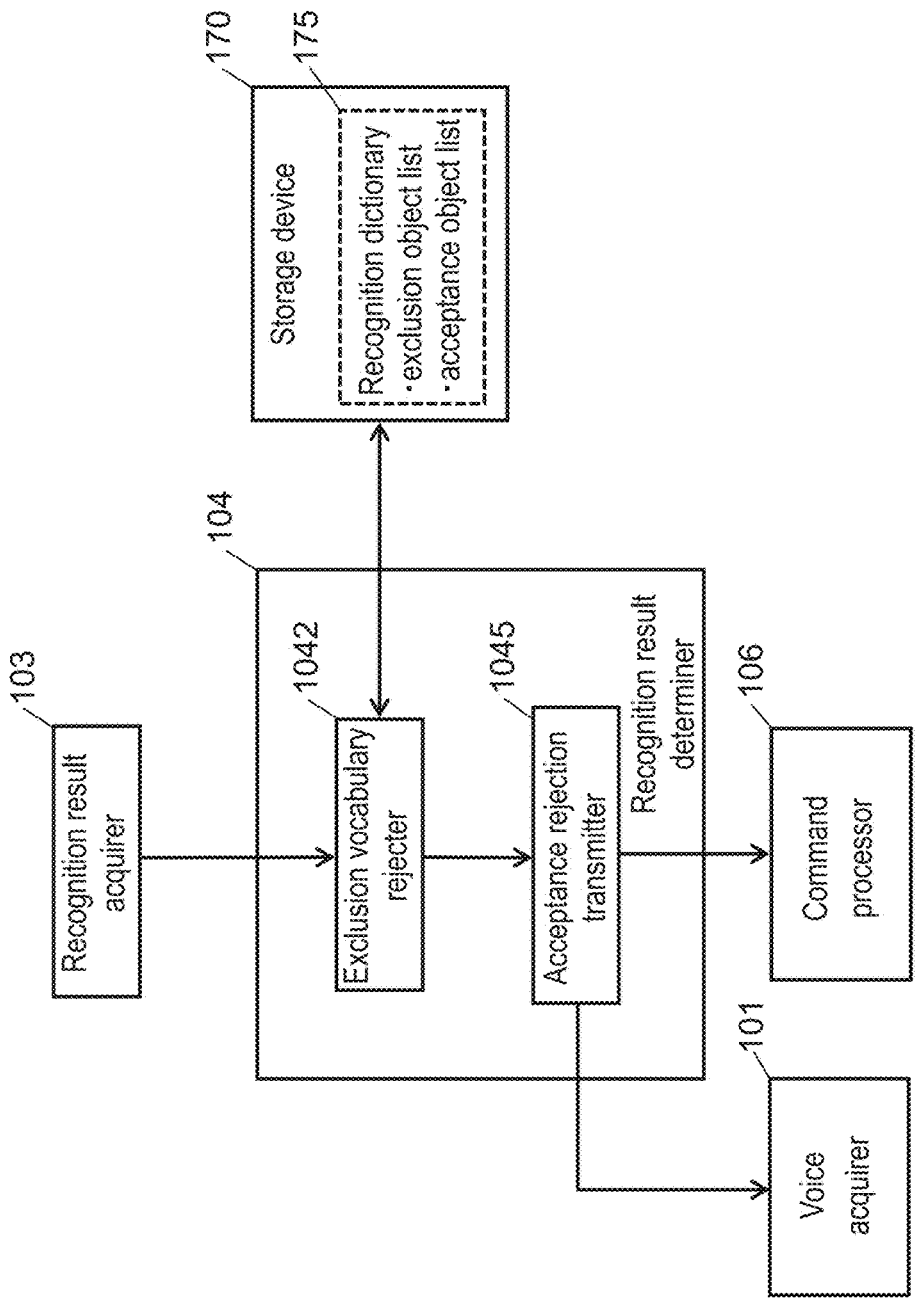
FIG. 3 is a block diagram illustrating a configuration example of a recognition result determiner of a voice recognition processing apparatus according to the first exemplary embodiment.

FIG. 3 is a block diagram illustrating a configuration example of recognition result determiner 104 of voice recognition processing apparatus 100 according to the first exemplary embodiment.

Recognition result determiner 104 includes exclusion vocabulary rejecter 1042 and acceptance rejection transmitter 1045. Detailed operations of these units will be described later.

[1-2. Operation]

Next, operations of voice recognition processing apparatus 100 of television 10 according to the present exemplary embodiment will be described.

Figure 4:
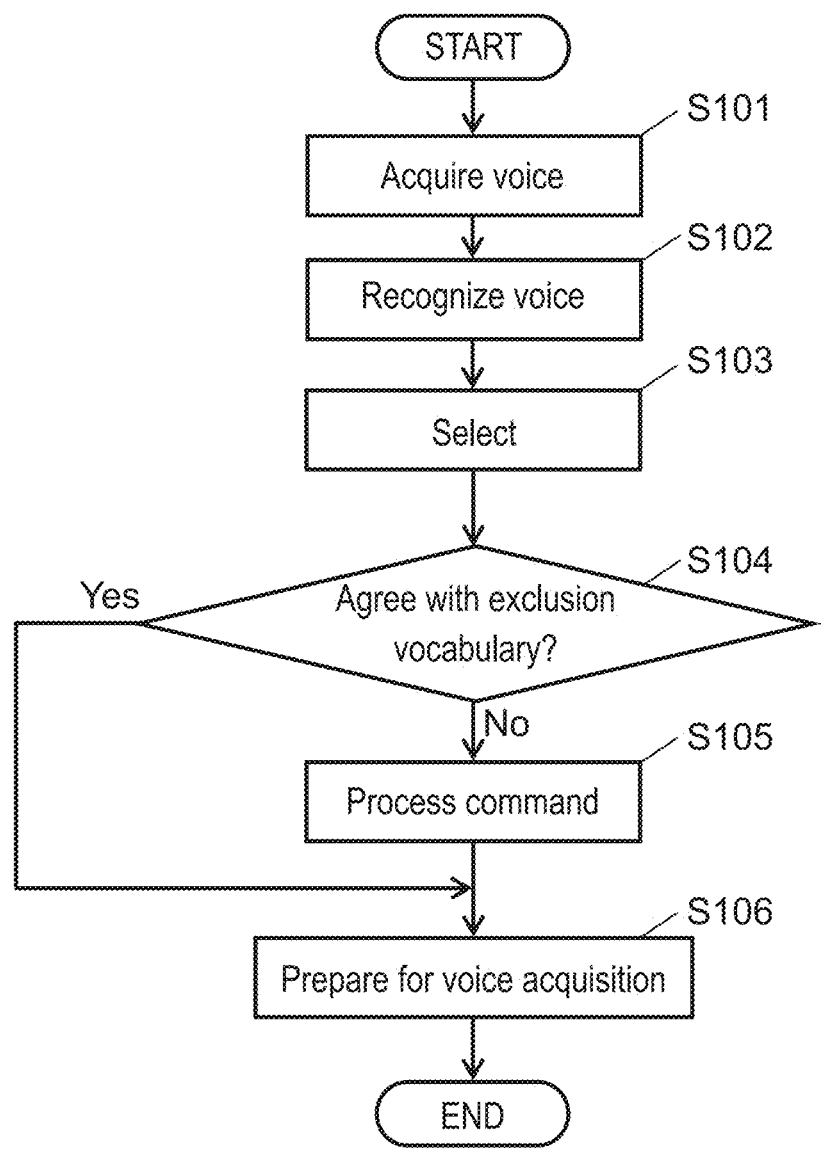
FIG. 4 is a flow chart illustrating an operation example of the voice recognition processing apparatus according to the first exemplary embodiment.

FIG. 4 is a flow chart illustrating an operation example of voice recognition processing apparatus 100 according to the first exemplary embodiment.

Voice acquirer 101 acquires the voice signal generated from the voice uttered by user 700 from built-in microphone 130 of television 10 (step S101).

Voice acquirer 101 may acquire the voice signal from a microphone incorporated in a remote control (not illustrated) or a microphone incorporated in a mobile terminal (not illustrated) via a wireless communicator (not illustrated).

Then, voice acquirer 101 converts the voice signal into the voice information that can be used for various types of downstream processing, and outputs the voice information to voice recognizer 102. It is to be noted that, when the voice signal is a digital signal, voice acquirer 101 may use the voice signal as it is as the voice information.

Voice recognizer 102 converts the voice information acquired from voice acquirer 101 into character string information. Then, voice recognizer 102 outputs the character string information to recognition result acquirer 103 as a result of voice recognition. In addition, voice recognition server 50 converts the voice information acquired from television 10 via network 40 into character string information, and replies the character string information to television 10 as a result of voice recognition (step S102).

Specifically based on the voice information acquired from voice acquirer 101, voice recognizer 102 refers to an acceptance object list in recognition dictionary 175 previously stored in storage device 170. Then, voice recognizer 102 compares the voice information with the voice recognition models registered in the acceptance object list.

The voice recognition models refer to information for associating the voice information with the character string information. In voice recognition, the voice information is compared with each of the plurality of voice recognition models, and one voice recognition model that agrees with or is similar to the voice information is selected. Then, character string information associated with the voice recognition model becomes a result of voice recognition of the voice information. Voice recognition models related to operations of television 10 are registered in the acceptance object list, for example, instructions to television 10 (for example, channel change, volume change, etc.), functions of television 10 (for example, network connection function, etc.), unit names of television 10 (for example, power supply and channel), and instructions to content displayed on a screen of television 10 (for example, zoom in, zoom out, scroll).

It is to be noted that, in addition to the acceptance object list, an exclusion object list (not illustrated in FIG. 2) described later is also registered in recognition dictionary 175 stored in storage device 170.

Voice recognizer 102 compares the voice information with the voice recognition models registered in the acceptance object list. Then, when the voice information acquired from voice acquirer 101 includes information corresponding to the voice recognition model registered in the acceptance object list, voice recognizer 102 outputs the character string information associated with the voice recognition model to recognition result acquirer 103 as a result of voice recognition.

Voice recognizer 102 calculates a recognition score when comparing the voice information with the voice recognition models. The recognition score is a numerical value that represents likelihood, and is an indicator indicating to what extent the voice information agrees with or is similar to the voice recognition models. The larger the numerical value is, the higher a degree of similarity is. Voice recognizer 102 compares the voice information with the voice recognition models, and selects a plurality of voice recognition models as candidates. At this time, voice recognizer 102 calculates a recognition score for each of the voice recognition models. It is to be noted that a method for calculating this recognition score may be a commonly known method. Then, voice recognizer 102 selects a voice recognition model having a recognition score that is highest and is equal to or higher than a preset threshold value, and outputs character string information corresponding to the selected voice recognition model as a result of voice recognition. It is to be noted that voice recognizer 102 may output, along with the character string information, the recognition score related to the character string information to recognition result acquirer 103.

In this way, voice recognizer 102 converts the voice information into the character string information. It is to be noted that voice recognizer 102 may convert the voice information into information other than the character string information to output the converted information. In addition, if there is no voice recognition model having a recognition score that is equal to or higher than the threshold value, voice recognizer 102 may output information representing inability to recognize the voice.

In addition, voice recognizer 102 transmits the voice information acquired from voice acquirer 101, from transmitter-receiver 150 via network 40 to voice recognition server 50.

Based on the voice information received from television 10, voice recognition server 50 refers to recognition dictionary 55. Then, voice recognition server 50 compares the voice information with the voice recognition models in recognition dictionary 55 to convert the voice information into character string information.

Voice recognition server 50 calculates the recognition score when comparing the received voice information with the voice recognition models in recognition dictionary 55. This recognition score is a numerical value representing likelihood similar to the likelihood of the recognition score calculated by voice recognizer 102, and is calculated by a method similar to a method for calculating the recognition score by voice recognizer 102. In a similar manner to voice recognizer 102, voice recognition server 50 selects a plurality of voice recognition models as candidates based on the received voice information, and selects one voice recognition model from among the candidates based on the recognition score. Then, voice recognition server 50 replies the character string information associated with the voice recognition model to television 10 as a result of voice recognition. Voice recognition server 50 may transmit, along with the character string information, the recognition score related to the character string information to television 10.

Voice recognition server 50 is configured to collect various terms through network 40 and to register those terms in recognition dictionary 55. Accordingly, voice recognition server 50 can include more voice recognition models as compared with recognition dictionary 175 included in television 10. Therefore, in voice recognition server 50, when user 700 utters a word (for example, conversation among the users and a monologue of the user) that is irrelevant to functions of television 10 or instructions to television 10, the recognition score of voice recognition of the voice is likely to become high as compared with a case where voice recognizer 102 of television 10 performs similar voice recognition.

On receipt of the result of voice recognition from voice recognition server 50 via network 40, transmitter-receiver 150 outputs the result of voice recognition to recognition result acquirer 103.

On receipt of the result of voice recognition from each of voice recognizer 102 and voice recognition server 50, recognition result acquirer 103 selects one of the voice recognition results in accordance with a determination rule (step S103).

This determination rule may be, for example, comparison of a recognition score associated with a result of voice recognition received from voice recognizer 102 with a recognition score associated with a result of voice recognition received from voice recognition server 50, and selection of the voice recognition result with a higher recognition score. Recognition result acquirer 103 outputs the selected voice recognition result to recognition result determiner 104.

It is to be noted that, when recognition result acquirer 103 can receive the result of voice recognition only from one of voice recognizer 102 and voice recognition server 50, recognition result acquirer 103 may skip processing of step S103 and may output the received result of voice recognition as it is.

Exclusion vocabulary rejecter 1042 of recognition result determiner 104 illustrated in FIG. 3 determines whether the result of voice recognition that is output from recognition result acquirer 103 agrees with any character string information in a vocabulary (exclusion vocabulary) registered in an exclusion object list (step S104).

The exclusion object list refers to a list in which a word (vocabulary) determined not to be used for voice operation of television 10 is registered as the exclusion vocabulary. The exclusion vocabulary is, for example, a vocabulary except a vocabulary registered in recognition dictionary 175 of storage device 170 as the acceptance object list. This exclusion object list, which is previously registered in recognition dictionary 175 of storage device 170, may be configured so that a new exclusion vocabulary can be added arbitrarily. It is to be noted that, if the exclusion object list has, as the exclusion vocabulary, registration of a vocabulary having pronunciation similar to pronunciation of a word that user 700 utters during voice operation of television 10 and having no relationship with the voice operation of television 10, accuracy of voice recognition can be improved.

In step S104, exclusion vocabulary rejecter 1042 compares the exclusion object list in recognition dictionary 175 stored in storage device 170 with the character string information that is the result of voice recognition that is output from recognition result acquirer 103. Exclusion vocabulary rejecter 1042 examines presence of character string information that agrees with a word in the exclusion vocabulary included in the exclusion object list. Then, exclusion vocabulary rejecter 1042 determines that the character string information that agrees with a word included in the exclusion vocabulary is information to be rejected, sets a flag, and outputs the character string information to acceptance rejection transmitter 1045 (Yes).

If a flag is set in the character string information that is input from exclusion vocabulary rejecter 1042, acceptance rejection transmitter 1045 outputs the character string information to voice acquirer 101 as rejection information. On receipt of the rejection information, voice acquirer 101 prepares for voice acquisition in preparation for next voice recognition (step S106). Therefore, command processor 106 performs no processing on the character string information (rejection information) in which a flag is set.

In step S104, exclusion vocabulary rejecter 1042 determines that the character string information, that does not agree with any words included in the exclusion vocabulary, is information to be accepted (executed), and outputs the character string information to acceptance rejection transmitter 1045 without setting a flag (No).

If no flag is set in the character string information that is input from exclusion vocabulary rejecter 1042, acceptance rejection transmitter 1045 outputs the character string information to command processor 106. Command processor 106 executes command processing in accordance with an instruction represented by the character string information received from acceptance rejection transmitter 1045 (step S105).

For example, when the character string information includes command information regarding control of television 10, such as channel change and volume change, command processor 106 issues an instruction to a controller (not illustrated) of television 10 so that an operation corresponding to the command information may be executed in television 10.

After completion of step S105, command processor 106 transmits a signal indicating that command processing has been completed to voice acquirer 101. On receipt of the signal, voice acquirer 101 prepares for voice acquisition in preparation for next voice recognition (step S106).

[1-3. Effect and Others]

As described above, in the present exemplary embodiment, voice recognition processing apparatus 100 includes voice acquirer 101, voice recognizer 102 that is one example of the first voice recognizer, storage device 170, and recognition result determiner 104. Voice acquirer 101 is configured to acquire the voice uttered by user 700 and to output the voice information. Voice recognizer 102 is configured to convert the voice information into the character string information that is an example of the first information. Storage device 170 previously stores recognition dictionary 175 in which the exclusion vocabulary is registered. Recognition dictionary 175 is an example of a dictionary. Recognition result determiner 104 compares the character string information with the exclusion vocabulary, and determines whether the character string information includes a word that agrees with a word included in the exclusion vocabulary. Then, when the character string information includes the word that agrees with a word included in the exclusion vocabulary, recognition result determiner 104 determines that the character string information is information to be rejected. When the character string information does not include the word that agrees with a word included in the exclusion vocabulary, recognition result determiner 104 determines that the character string information is information to be executed.

In addition, voice recognition processing apparatus 100 may further include voice recognition server 50 that is an example of the second voice recognizer, and recognition result acquirer 103 that is an example of the selector. In this case, voice recognition server 50 is configured to convert the voice information into the character string information that is an example of the second information. Recognition result acquirer 103 is configured to select and output one of the character string information that voice recognizer 102 outputs and the character string information that voice recognition server 50 outputs. Then, recognition result determiner 104 determines whether to reject or execute the character string information selected by recognition result acquirer 103.

Voice recognition server 50 that is an example of the second voice recognizer may be installed on network 40. Voice recognition processing apparatus 100 may include transmitter-receiver 150 configured to communicate with voice recognition server 50 via network 40.

Voice recognition processing apparatus 100 configured in this way can discriminate a voice that user 700 utters for voice operation from a voice of conversation among users 700 or a monologue of user 700 with good accuracy, reduce false recognition, and improve accuracy of voice recognition.

For example, it is assumed that user 700 utters a word having pronunciation similar to pronunciation of a word uttered during voice operation of television 10, and having no relationship with voice operation of television 10. At this time, as a result of voice recognition based on the voice, voice recognizer 102 is likely to output character string information registered in the acceptance object list (that is, likely to perform false recognition).

Meanwhile, voice recognition server 50 has recognition dictionary 55 that is likely to have more registered voice recognition models (vocabulary) than recognition dictionary 175 because registered information is updated through network 40. Accordingly, voice recognition server 50 is likely to perform more accurate voice recognition of such a voice.

Therefore, it is likely that, compared with a recognition score associated with character string information that is output from voice recognizer 102 that falsely recognizes a voice that is easy to be falsely recognized, a recognition score associated with character string information that is output from voice recognition server 50 that performs voice recognition of this voice has a larger numerical value. Therefore, it is likely that the character string information that is output from voice recognition server 50 is selected by recognition result acquirer 103.

Then, if a vocabulary that corresponds to this character string information has been registered in the exclusion object list in recognition dictionary 175 as the exclusion vocabulary, exclusion vocabulary rejecter 1042 determines that this character string information is information to be rejected.

In this way, the present exemplary embodiment makes it possible to improve accuracy of voice recognition of a voice that is likely to be falsely recognized by voice recognizer 102, and to prevent command processor 106 from performing false command processing due to false recognition.

In addition, although voice recognizer 102 is likely to recognize a voice falsely in cases where the voice uttered by user 700 is not sufficiently large or where there is much noise, accuracy of voice recognition can be improved even in such cases.

It is to be noted that, if recognition dictionary 175 included in voice recognizer 102 is configured so that registered information can be updated through network 40 in a similar manner to recognition dictionary 55 of voice recognition server 50, voice recognition processing system 11 may be configured so that voice recognition may be performed only by television 10. Even in such a configuration, operations of recognition result determiner 104 can reduce false recognition and improve accuracy of voice recognition.

Second Exemplary Embodiment

Next, a second exemplary embodiment will be described with reference to FIG. 5 to FIG. 7. The second exemplary embodiment describes a method for increasing accuracy of voice recognition of a word that user 700 is likely to utter (for example, a word regarding operations, functions, etc. of television 10).

[2-1. Configuration]

Figure 5:
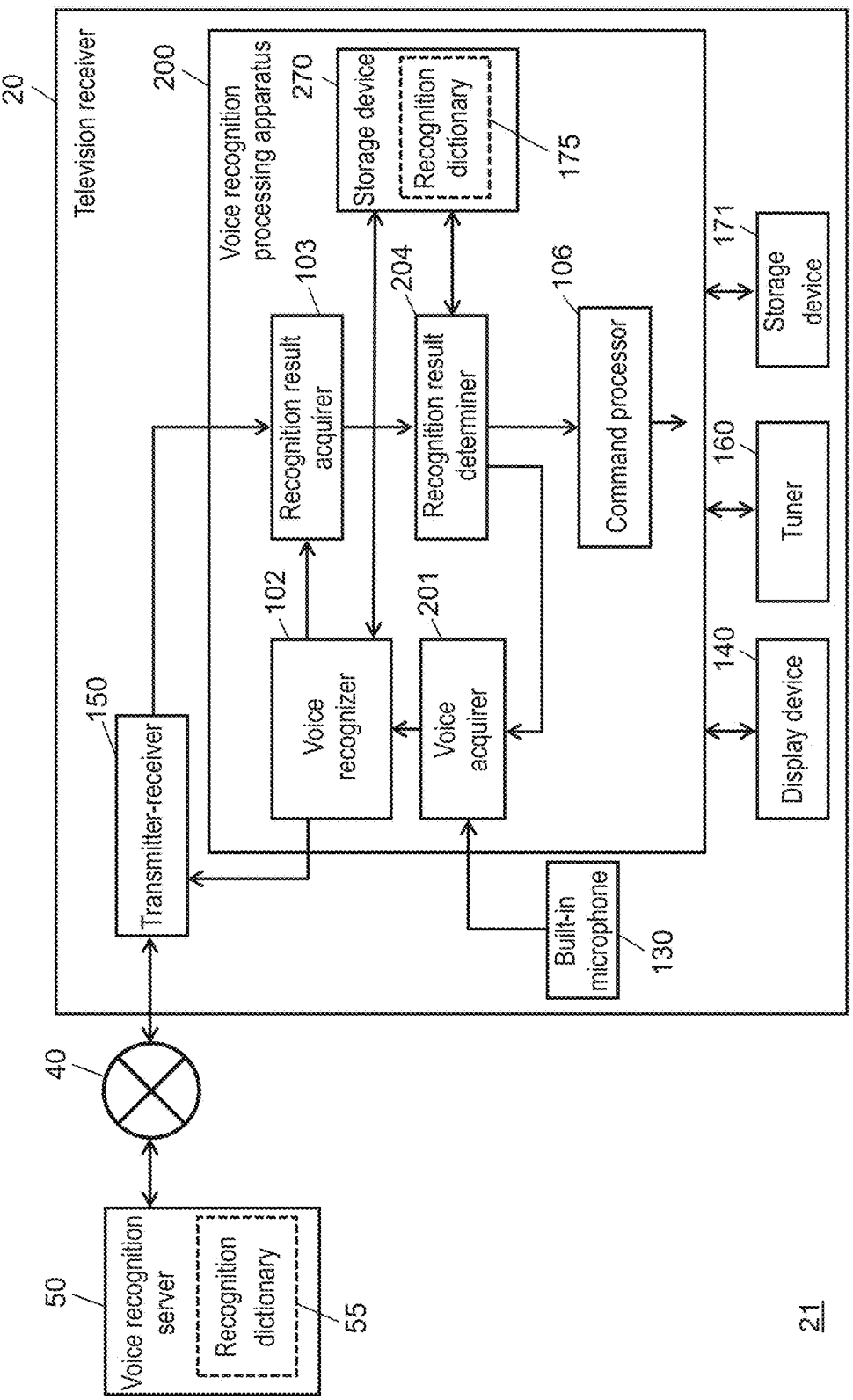
FIG. 5 is a block diagram illustrating a configuration example of the voice recognition processing system according to a second exemplary embodiment.

FIG. 5 is a block diagram illustrating a configuration example of voice recognition processing system 21 according to the second exemplary embodiment.

Voice recognition processing system 21 according to the present exemplary embodiment includes television 20 that is an example of a display apparatus, and voice recognition server 50. Since voice recognition server 50 is substantially identical to voice recognition server 50 described in the first exemplary embodiment, description will be omitted.

Television 20 includes voice recognition processing apparatus 200, display device 140, transmitter-receiver 150, tuner 160, storage device 171, and built-in microphone 130. Voice recognition processing apparatus 200 includes voice acquirer 201, voice recognizer 102, recognition result acquirer 103, recognition result determiner 204, command processor 106, and storage device 270.

It is to be noted that components performing operations substantially identical to operations of components included in television 10 described in the first exemplary embodiment are provided with reference symbols identical to reference symbols of the first exemplary embodiment, and description will be omitted.

In addition, it is assumed that recognition dictionary 175 in storage device 270 has registration of an acceptance object list and exclusion object list that are similar to an acceptance object list and exclusion object list described in the first exemplary embodiment.

Voice recognition processing apparatus 200 according to the second exemplary embodiment differs from voice recognition processing apparatus 100 described in the first exemplary embodiment in operations in voice acquirer 201 and recognition result determiner 204.

In a similar manner to voice acquirer 101 described in the first exemplary embodiment, voice acquirer 201 acquires a voice signal generated from a voice uttered by user 700 from built-in microphone 130. However, different from voice acquirer 101 described in the first exemplary embodiment, voice acquirer 201 creates utterance duration information and utterance form information based on the acquired voice signal.

The utterance duration information refers to information indicating a length of time uttered by user 700. Voice acquirer 201 can create the utterance duration information by, for example, measuring the length of time during which a voice having volume equal to or higher than a preset threshold is continuously made. Voice acquirer 201 may create the utterance duration information by another method.

The utterance form information refers to information indicating lengths of silent periods that occur before and after utterance of user 700, or lengths of periods that can be substantially considered as silent. Voice acquirer 201 can create the utterance form information by, for example, considering that a condition in which volume is lower than a preset threshold is silence, and by measuring the lengths of the silent periods that occur before and after utterance. Voice acquirer 201 may create the utterance form information by another method.

Voice acquirer 201 adds each of the utterance duration information and the utterance form information to voice information, and outputs these information items to voice recognizer 102.

A voice, such as conversation among a plurality of users 700 and a monologue of user 700, may include a word in a vocabulary (acceptance object vocabulary) registered in the acceptance object list. Then, this voice may be collected by built-in microphone 130, and the voice information based on this voice may be input into voice recognizer 102. In such a case, voice recognizer 102 may perform false voice recognition based on such voice information, and command processor 106 may perform false command processing based on the false recognition, although user 700 does not have an intention to perform voice operation of television 20. In order to reduce occurrence of such false recognition, in addition to the exclusion object list described in the first exemplary embodiment, the present exemplary embodiment performs voice recognition using "the utterance duration information" and "the utterance form information".

Details of the utterance duration information and the utterance form information will be described later. In addition, voice recognizer 102 transmits the voice information to which the utterance duration information and the utterance form information are added, to voice recognition server 50 via transmitter-receiver 150 and network 40.

[2-2. Operation]

Next, a configuration and operation of recognition result determiner 204 included in voice recognition processing apparatus 200 of television 20 according to the present exemplary embodiment will be described with reference to FIG. 6 and FIG. 7.

Figure 6:
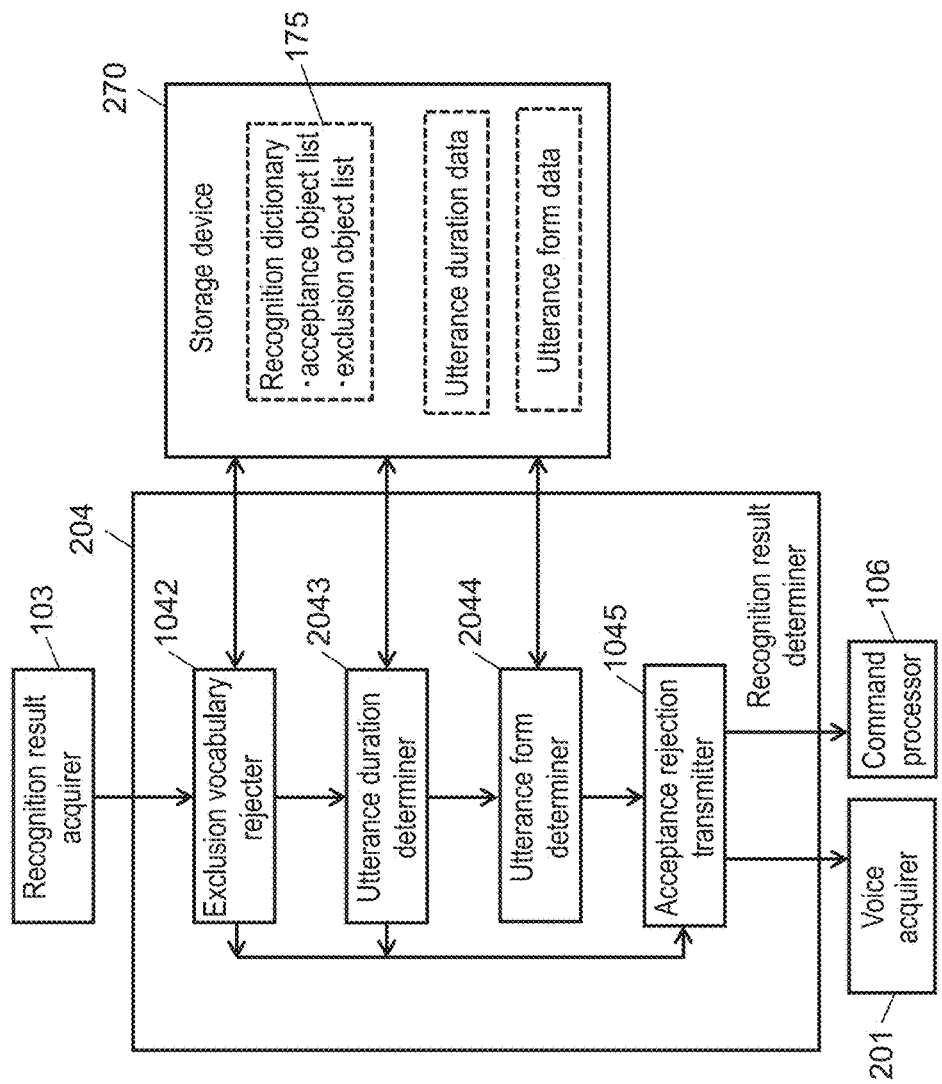
FIG. 6 is a block diagram illustrating a configuration example of the recognition result determiner of the voice recognition processing apparatus according to the second exemplary embodiment.

FIG. 6 is a block diagram illustrating a configuration example of recognition result determiner 204 of voice recognition processing apparatus 200 according to the second exemplary embodiment.

Recognition result determiner 204 includes exclusion vocabulary rejecter 1042, utterance duration determiner 2043, utterance form determiner 2044, and acceptance rejection transmitter 1045.

Figure 7:
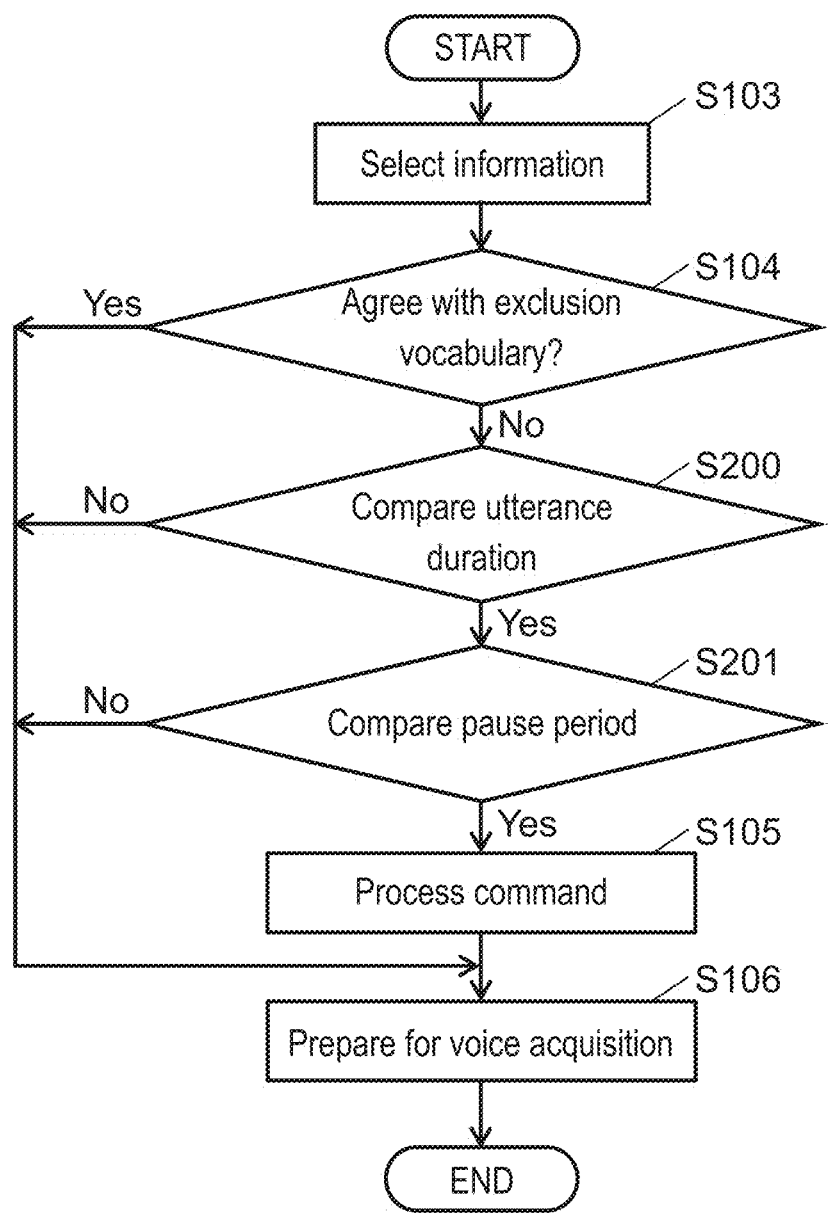
FIG. 7 is a flow chart illustrating an operation example of the recognition result determiner according to the second exemplary embodiment.

FIG. 7 is a flow chart illustrating an operation example of recognition result determiner 204 according to the second exemplary embodiment.

As in step S103 described in the first exemplary embodiment, on receipt of results of voice recognition from each of voice recognizer 102 and voice recognition server 50, recognition result acquirer 103 selects one of the voice recognition results in accordance with a determination rule (step S103). This determination rule is substantially identical to the determination rule described in the first exemplary embodiment.

As in step S104 described in the first exemplary embodiment, exclusion vocabulary rejecter 1042 of recognition result determiner 204 determines whether the result of voice recognition that is output from recognition result acquirer 103 includes a word that agrees with a word included in a vocabulary (exclusion vocabulary) registered in the exclusion object list (step S104).

In step S104, in a similar manner to exclusion vocabulary rejecter 1042 described in the first exemplary embodiment, exclusion vocabulary rejecter 1042 compares the exclusion object list in recognition dictionary 175 stored in storage device 270 with character string information that is the result of voice recognition that is output from recognition result acquirer 103, to examine presence of character string information that agrees with a word in the exclusion vocabulary included in the exclusion object list. Then, exclusion vocabulary rejecter 1042 determines that the character string information that agrees with a word included in the exclusion vocabulary is information to be rejected, sets a flag, and outputs the character string information to acceptance rejection transmitter 1045 (Yes).

In a similar manner to acceptance rejection transmitter 1045 described in the first exemplary embodiment, acceptance rejection transmitter 1045 outputs the flagged character string information to voice acquirer 201 as rejection information. On receipt of the rejection information, voice acquirer 201 prepares for voice acquisition in preparation for next voice recognition (step S106).

On the other hand, in step S104, exclusion vocabulary rejecter 1042 outputs character string information that does not agree with any words included in the exclusion vocabulary to utterance duration determiner 2043 as it is without setting a flag (No).

Utterance duration determiner 2043 makes a second determination whether to reject or accept (execute) the unflagged character string information that is input from exclusion vocabulary rejecter 1042, based on utterance duration (step S200).

Here, "the utterance duration" used by utterance duration determiner 2043 will be described. The utterance duration is a length of time of utterance. Here, an utterance of user 700 for performing voice operation of television 20 is described as "an utterance for control", while an utterance that is not for a purpose of voice operation of television 20 (for example, conversation among users 700 and a monologue of user 700) is described as "an utterance for conversation".

In the present exemplary embodiment, utterance duration data (data indicating a length of time required for utterance) corresponding to each word of the acceptance object vocabulary included in the acceptance object list registered in recognition dictionary 175 is previously stored in storage device 270. This allows utterance duration determiner 2043 to calculate the utterance duration of a word included in the acceptance object vocabulary, selected as a result of voice recognition. It is to be noted that this utterance duration data preferably has a margin (range) in consideration of differences of utterance speed among individuals and the like.

It has been confirmed that "the utterance for control" includes about one word or two words in many cases. In addition, it is likely that all of these words (vocabulary) are words included in the acceptance object vocabulary registered in the acceptance object list. Therefore, it is likely that, after voice recognition of "the utterance for control", the utterance duration based on the utterance duration data of the word in the acceptance object vocabulary selected as a result of voice recognition becomes closer to the utterance duration of "the utterance for control" indicated by the utterance duration information created by voice acquirer 201. It is assumed that, when a plurality of words included in the acceptance object vocabulary is selected as a result of voice recognition, the utterance duration is calculated based on the utterance duration data corresponding to the plurality of the words in the acceptance object vocabulary.

On the other hand, "the utterance for conversation" includes a plurality of words in many cases, and those words (vocabularies) are unlikely to include a word corresponding to the acceptance object vocabulary registered in the acceptance object list. Therefore, it is likely that, after voice recognition of "the utterance for conversation", the utterance duration based on the utterance duration data of the word included in the acceptance object vocabulary selected as a result of voice recognition becomes shorter than the utterance duration of "the utterance for conversation" indicated by the utterance duration information created by voice acquirer 201.

Thus, voice recognition processing apparatus 200 can determine whether the voice that is an object of voice recognition is based on "the utterance for control" or "the utterance for conversation", by comparing the utterance duration based on the utterance duration data of the word(s) included in the acceptance object vocabulary selected by voice recognizer 102 as a result of voice recognition with the utterance duration based on the utterance duration information created by voice acquirer 201. In the present second exemplary embodiment, utterance duration determiner 2043 makes this determination.

In step S200, based on the word included in the acceptance object vocabulary that is output from recognition result acquirer 103 as a result of voice recognition, utterance duration determiner 2043 reads the utterance duration data which is associated with the word included in the acceptance object vocabulary from storage device 270. When receiving a plurality of words included in the acceptance object vocabulary, utterance duration determiner 2043 reads the utterance duration data regarding all of the words from storage device 270. Then, utterance duration determiner 2043 calculates the utterance duration based on the read utterance duration data. Then, utterance duration determiner 2043 compares a result of the calculation with the utterance duration indicated by the utterance duration information created by voice acquirer 201. While utterance duration determiner 2043 may compare the calculated utterance duration with the utterance duration indicated by the utterance duration information as it is, utterance duration determiner 2043 may set a range for determination based on the calculated utterance duration. Here, an example of setting a range for comparison will be described.

In step S200, when the utterance duration indicated by the utterance duration information created by voice acquirer 201 is outside the range that is set based on the calculated utterance duration (No), utterance duration determiner 2043 determines that the unflagged character string information that is output from exclusion vocabulary rejecter 1042 is based on "the utterance for conversation", and that the unflagged character string information is to be rejected. Utterance duration determiner 2043 sets a flag in this character string information, and outputs the flagged character string information to acceptance rejection transmitter 1045.

If a flag is set in the character string information that is input from utterance duration determiner 2043, acceptance rejection transmitter 1045 outputs the character string information to voice acquirer 201 as rejection information. On receipt of the rejection information, voice acquirer 201 prepares for voice acquisition in preparation for next voice recognition (step S106).

On the other hand, in step S200, when the utterance duration indicated by the utterance duration information created by voice acquirer 201 is within the range that is set based on the calculated utterance duration (Yes), utterance duration determiner 2043 determines that the unflagged character string information that is output from exclusion vocabulary rejecter 1042 is based on "the utterance for control". Utterance duration determiner 2043 avoids setting a flag in this character string information, and outputs the character string information as it is to utterance form determiner 2044.

It is to be noted that utterance duration determiner 2043 may set the range for determination by, for example, multiplying the calculated utterance duration by a predetermined numerical value (for example, 1.5). This numerical value is only an example and may be another numerical value. Alternatively, utterance duration determiner 2043 may set the range for determination by, for example, adding a predetermined numerical value to the calculated utterance duration, and may set the range by another method.

Utterance form determiner 2044 makes a second determination whether to reject or accept (execute) the unflagged character string information that is input from utterance duration determiner 2043, based on an utterance form (step S201).

Here, "the utterance form" used by utterance form determiner 2044 will be described. This "utterance form" refers to a silent period that occurs immediately before user 700 utters, or to a period that can be substantially considered as silent (hereinafter described as "a pause period"), and to a pause period that occurs immediately after user 700 finishes utterance.

A result of comparison between "the utterance for control" and "the utterance for conversation" has verified that there is a difference in the utterance form.

In a case of "the utterance for control", long pause periods exist before and after user 700 utters, as compared with "the utterance for conversation". The pause period that occurs immediately before user 700 utters is a period for preparation for utterance. The pause period that occurs immediately after user 700 finishes utterance is a period for waiting for an operation (operation based on voice operation) corresponding to uttered information to be started.

On the other hand, in a case of "the utterance for conversation", such pause periods are relatively short before and after utterance of user 700.

Therefore, it is possible to determine whether a voice that is an object of voice recognition is based on "the utterance for control" or based on "the utterance for conversation" by detecting lengths of the pause periods before and after utterance. Then, in the present second exemplary embodiment, utterance form determiner 2044 makes this determination based on the utterance form information created by voice acquirer 201.

In step S201, based on the word included in the acceptance object vocabulary that is output from utterance duration determiner 2043, utterance form determiner 2044 reads utterance form data which is associated with the word included in the acceptance object vocabulary from storage device 270. This utterance form data refers to data indicating the lengths of respective pause periods that occur before and after utterance of the word included in the acceptance object vocabulary. In the present exemplary embodiment, the utterance form data which is associated with the word included in the acceptance object vocabulary is previously stored in storage device 270. Then, utterance form determiner 2044 compares the utterance form data that is read from storage device 270 with the utterance form information (the utterance form information created by voice acquirer 201) added to the character string information that is input from utterance duration determiner 2043.

Specifically, utterance form determiner 2044 compares the lengths of the pause periods before and after utterance indicated by the utterance form information created by voice acquirer 201, with the lengths of the pause periods before and after utterance indicated by the utterance form data that is read from storage device 270, respectively. It is to be noted that utterance form determiner 2044 may compare the utterance form information created by voice acquirer 201 as it is with the utterance form data that is read from storage device 270, but utterance form determiner 2044 may set a range for determination based on the utterance form data that is read from storage device 270. It is to be noted that, when receiving a plurality of words included in the acceptance object vocabulary, utterance form determiner 2044 may read utterance form data regarding all of the words from storage device 270, and may select either one with a larger value. Alternatively, utterance form determiner 2044 may select either one with a smaller value, or may calculate an average value or a medium value.

In step S201, when at least one of the lengths of the pause periods before and after utterance indicated by the utterance form information created by voice acquirer 201 is shorter than the lengths of the pause periods before and after utterance indicated by the utterance form data that is read from storage device 270 (No), utterance form determiner 2044 determines that the unflagged character string information that is output from utterance duration determiner 2043 is based on "the utterance for conversation", sets a flag in this character string information, and outputs the flagged character string information to acceptance rejection transmitter 1045.

When a flag is set in the character string information that is input from utterance form determiner 2044, acceptance rejection transmitter 1045 outputs the character string information to voice acquirer 201 as rejection information. On receipt of the rejection information, voice acquirer 201 prepares for voice acquisition in preparation for next voice recognition (step S106).

On the other hand, in step S201, when both of the lengths of the pause periods before and after utterance indicated by the utterance form information created by voice acquirer 201 are equal to or longer than the lengths of the pause periods before and after utterance indicated by the utterance form data that is read from storage device 270 (Yes), utterance form determiner 2044 determines that the unflagged character string information that is output from utterance duration determiner 2043 is based on "the utterance for control", avoids setting a flag in this character string information, and outputs the character string information as it is to acceptance rejection transmitter 1045.

Accordingly, the unflagged character string information received by acceptance rejection transmitter 1045 is character string information in which a flag is not set by any of exclusion vocabulary rejecter 1042, utterance duration determiner 2043, and utterance form determiner 2044. In other words, if a flag is not set in the character string information that is input into acceptance rejection transmitter 1045, the character string information is character string information that is determined to be accepted (to execute command processing), by all of exclusion vocabulary rejecter 1042, utterance duration determiner 2043, and utterance form determiner 2044. On the other hand, when a flag is set in the character string information that is input into acceptance rejection transmitter 1045, the character string information is character string information that is determined to be rejection information, by one of exclusion vocabulary rejecter 1042, utterance duration determiner 2043, and utterance form determiner 2044.

Acceptance rejection transmitter 1045 outputs the unflagged character string information to command processor 106 as it is as character string information to be accepted (executed).

Command processor 106 executes command processing in accordance with an instruction indicated by the character string information received from acceptance rejection transmitter 1045 (step S105).

After completion of step S105, command processor 106 transmits, to voice acquirer 201, a signal indicating that command processing is completed. On receipt of the signal, voice acquirer 201 prepares for voice acquisition in preparation for next voice recognition (step S106).

In step S106, the flagged character string information is output as rejection information from acceptance rejection transmitter 1045 to voice acquirer 201. On receipt of the rejection information, voice acquirer 201 prepares for voice acquisition in preparation for next voice recognition.

It is to be noted that whichever one of step S200 and step S201 may be performed first.

[2-3. Effect and Others]

As described above, in the present exemplary embodiment, voice recognition processing apparatus 200 includes voice acquirer 201, recognition result determiner 204, and storage device 270. Voice acquirer 201 measures the length of time uttered by user 700 based on the acquired voice to create the utterance duration information. In addition, voice acquirer 201 measures the lengths of the silent periods that occur before and after utterance of user 700 based on the acquired voice to create the utterance form information. Storage device 270 previously stores the utterance duration data representing the time required for utterance and the utterance form data representing the lengths of the silent periods that occur before and after utterance. Regarding the character string information that is determined not to include a word that agrees with a word included in the exclusion vocabulary and to be executed, recognition result determiner 204 reads the utterance duration data from storage device 270, and compares the read utterance duration data with the utterance duration information created by voice acquirer 201 to make a second determination whether to reject or execute the character string information based on the comparison. Then, regarding the character string information that is determined to be executed, recognition result determiner 204 reads the utterance form data from storage device 270, and compares the read utterance form data with the utterance form information created by voice acquirer 201 to make a second determination whether to reject or execute the character string information based on the comparison. This character string information is an example of the first information.

In voice recognition processing apparatus 200 configured in this way, when a flag is not set in the character string information that is input into acceptance rejection transmitter 1045, this character string information is character string information that is determined to be accepted (to execute command processing), by all of exclusion vocabulary rejecter 1042, utterance duration determiner 2043, and utterance form determiner 2044. On the other hand, when a flag is set in the character string information that is input into acceptance rejection transmitter 1045, this character string information is character string information that is determined to be rejection information, by one of exclusion vocabulary rejecter 1042, utterance duration determiner 2043, and utterance form determiner 2044. In this way, in the present exemplary embodiment, each of exclusion vocabulary rejecter 1042, utterance duration determiner 2043, and utterance form determiner 2044 determines whether to accept (command processing) or reject the character string information received by recognition result acquirer 103 as a result of voice recognition. Then, character string information that is determined to be rejected by either one of these units is rejected, and only character string information that is determined to be accepted by all of these units undergoes command processing.

This allows voice recognition processing apparatus 200 to determine with good accuracy whether the voice that undergoes voice recognition is a voice based on "the utterance for control", or a voice based on "the utterance for conversation". Therefore, voice recognition processing apparatus 200 can reduce false recognition and further improve accuracy of voice recognition.

Other Exemplary Embodiments

As described above, the first exemplary embodiment has been described as an example of a technique disclosed in the present application. However, the technique in the present disclosure is not limited to this example, and can be applied to exemplary embodiments to which change, replacement, addition, and omission have been made. In addition, it is also possible to make a new exemplary embodiment by combining elements described in the above-described first and second exemplary embodiments.

Therefore, other exemplary embodiments will be described below.

In the second exemplary embodiment, a configuration has been described in which recognition result determiner 204 includes utterance duration determiner 2043 and utterance form determiner 2044, in addition to exclusion vocabulary rejecter 1042, to improve accuracy of voice recognition. However, a recognition result determiner having a configuration that includes exclusion vocabulary rejecter 1042 combined with one of utterance duration determiner 2043 and utterance form determiner 2044 can also improve accuracy of voice recognition.

Figure 8A:
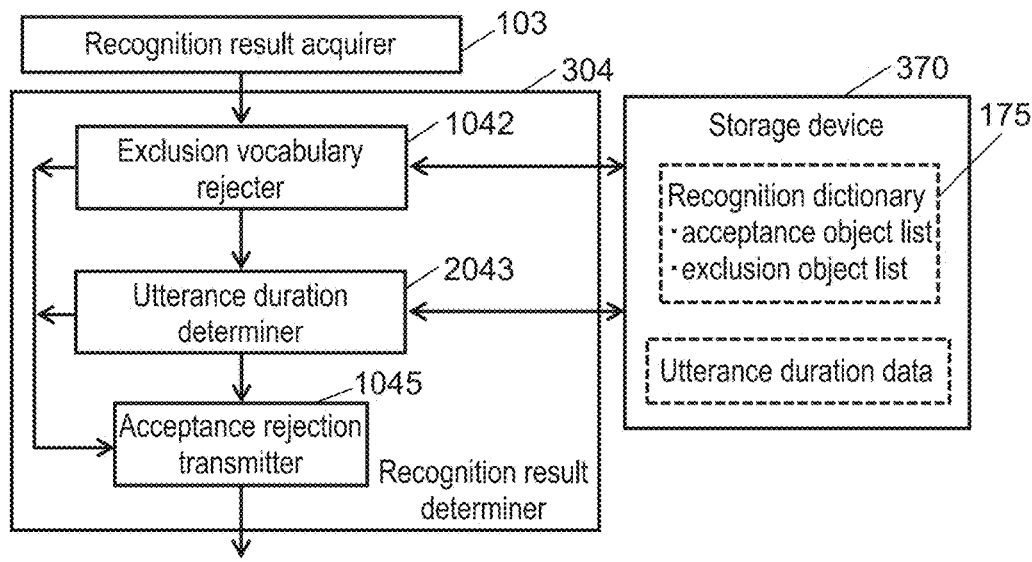
FIG. 8A is a block diagram illustrating a configuration example of the recognition result determiner according to another exemplary embodiment.
Figure 8B:
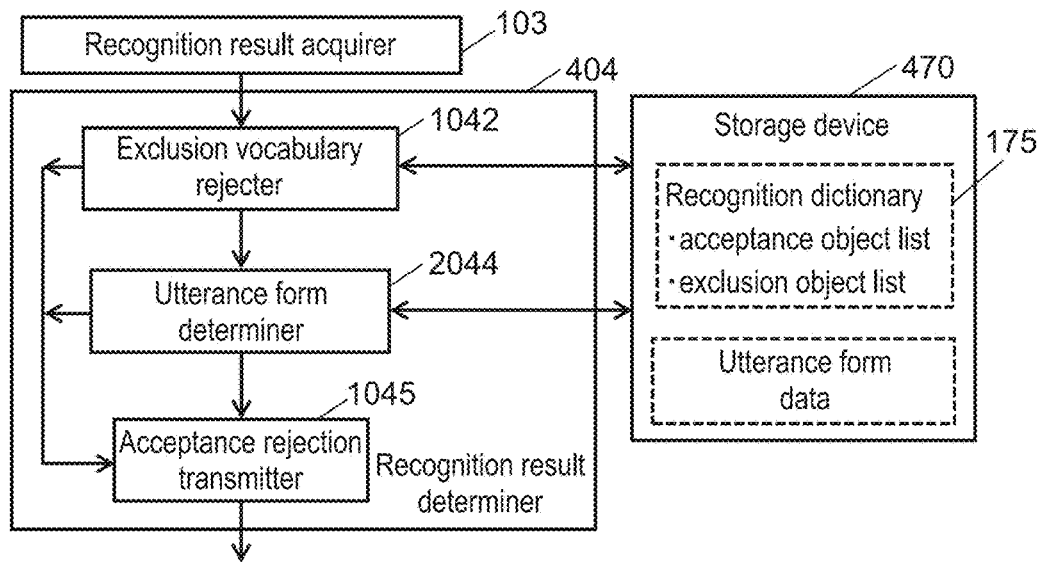
FIG. 8B is a block diagram illustrating a configuration example of the recognition result determiner according to another exemplary embodiment.

FIG. 8A is a block diagram illustrating a configuration example of recognition result determiner 304 in another exemplary embodiment. FIG. 8B is a block diagram illustrating a configuration example of recognition result determiner 404 in another exemplary embodiment.

It is to be noted that components that perform operations substantially identical to operations of components included in televisions 10 and 20 described in the first and second exemplary embodiments are provided with reference symbols identical to reference symbols of the first and second exemplary embodiments, and description will be omitted.

Recognition result determiner 304 illustrated in FIG. 8A has a configuration that includes exclusion vocabulary rejecter 1042, utterance duration determiner 2043, and acceptance rejection transmitter 1045, and does not include utterance form determiner 2044.

A voice recognition apparatus that includes recognition result determiner 304 illustrated in FIG. 8A operates as follows.

A voice acquirer (not illustrated) measures a length of time uttered by user 700 based on an acquired voice to create utterance duration information. Storage device 370 previously stores utterance duration data representing a time required for utterance. These pieces of utterance duration information and utterance duration data are substantially identical to utterance duration information and utterance duration data described in the second exemplary embodiment.

Regarding character string information that is determined by exclusion vocabulary rejecter 1042 not to include a word that agrees with a word included in an exclusion vocabulary and to be executed, recognition result determiner 304 reads the utterance duration data from storage device 370, and compares the read utterance duration data with the utterance duration information created by the voice acquirer to make a second determination whether to reject or execute the character string information based on the comparison. This character string information is an example of first information.

Specifically, recognition result determiner 304 operates as follows.

Utterance duration determiner 2043 makes a second determination whether to reject or accept (execute) the unflagged character string information that is input from exclusion vocabulary rejecter 1042, based on the utterance duration.

Since the operation of utterance duration determiner 2043 is substantially identical to operation of utterance duration determiner 2043 described in the second exemplary embodiment, description will be omitted.

Utterance duration determiner 2043 avoids setting a flag in the character string information that is determined to be based on "an utterance for control", and outputs the character string information as it is to acceptance rejection transmitter 1045. Acceptance rejection transmitter 1045 outputs the unflagged character string information as it is to command processor 106 as character string information to be accepted (executed).

Recognition result determiner 404 illustrated in FIG. 8B has a configuration that includes exclusion vocabulary rejecter 1042, utterance form determiner 2044, and acceptance rejection transmitter 1045, and does not include utterance duration determiner 2043.

A voice recognition apparatus that includes recognition result determiner 404 illustrated in FIG. 8B operates as follows.

A voice acquirer (not illustrated) measures lengths of silent periods that occur before and after utterance of user 700 based on an acquired voice to create utterance form information. Storage device 470 previously stores utterance form data representing the lengths of the silent periods that occur before and after utterance. These pieces of utterance form information and utterance form data are substantially identical to utterance form information and utterance form data described in the second exemplary embodiment.

Regarding the character string information that is determined by exclusion vocabulary rejecter 1042 not to include a word that agrees with a word included in the exclusion vocabulary and to be executed, recognition result determiner 404 reads the utterance form data from storage device 470, and compares the read utterance form data with the utterance form information created by the voice acquirer to make a second determination whether to reject or execute the character string information based on the comparison. This character string information is an example of the first information.

Specifically, recognition result determiner 404 operates as follows.

Utterance form determiner 2044 makes a second determination whether to reject or accept (execute) the unflagged character string information that is input from exclusion vocabulary rejecter 1042, based on utterance form.

Since the operation of utterance form determiner 2044 is substantially identical to operation of utterance form determiner 2044 described in the second exemplary embodiment, description will be omitted.

Utterance form determiner 2044 avoids setting a flag in the character string information that is determined to be based on "the utterance for control", and outputs the character string information as it is to acceptance rejection transmitter 1045. Acceptance rejection transmitter 1045 outputs the unflagged character string information as it is to command processor 106 as character string information to be accepted (executed).

Even if the recognition result determiner has, for example, a configuration that includes only one of utterance duration determiner 2043 and utterance form determiner 2044 as illustrated in FIG. 8A and FIG. 8B, respectively, the recognition result determiner is capable of improving accuracy of voice recognition.

While the example has been described in which voice recognition server 50 is disposed on network 40 in the present exemplary embodiment, voice recognition server 50 may be included in voice recognition processing apparatus 100. Alternatively, it is also possible to have a configuration in which voice recognition server 50 is not included, and in which voice recognition is performed only by voice recognizer 102.

Each block illustrated in FIGS. 2, 3, 5, 6, 8A, and 8B may be configured as an independent circuit block, and may be configured such that a processor may execute software that is programmed to implement an operation of each block.

INDUSTRIAL APPLICABILITY

The present disclosure is applicable to devices that perform processing operations instructed by a user. Specifically, the present disclosure is applicable to devices such as a mobile terminal device, a television receiver, a personal computer, a set top box, a videocassette recorder, a game machine, a smart phone, and a tablet terminal.

REFERENCE MARKS IN THE DRAWINGS 10, 20: television receiver
11, 21: voice recognition processing system
40: network
50: voice recognition server
55,175: recognition dictionary
100, 200: voice recognition processing apparatus
101, 201: voice acquirer 102: voice recognizer
103: recognition result acquirer
104, 204, 304, 404: recognition result determiner
106: command processor
130: built-in microphone
140: display device
150: transmitter-receiver
160: tuner
170, 171, 270, 370, 470: storage device
202: indicator
203: voice recognition icon
700: user
1042: exclusion vocabulary rejecter
1045: acceptance rejection transmitter
2043: utterance duration determiner
2044: utterance form determiner

The invention claimed is:

1. A voice recognition processing apparatus comprising:
a voice acquirer configured to acquire a voice uttered by a user and to output voice information;
a first voice recognizer configured to convert the voice information into first information;
a storage device that previously stores a dictionary in which an exclusion vocabulary is registered; and
a recognition result determiner that compares the first information with the exclusion vocabulary to determine whether the first information includes a word that agrees with a word included in the exclusion vocabulary, wherein the recognition result determiner:
determines that the first information is information to be rejected, when the first information includes the word that agrees with a word included in the exclusion vocabulary; and
determines that the first information is information to be executed, when the first information does not include the word that agrees with a word included in the exclusion vocabulary,
wherein the voice acquirer measures a length of time uttered by the user based on the acquired voice to create utterance duration information,
the storage device previously stores utterance duration data representing a time required for an utterance,
regarding the first information that is determined not to include the word that agrees with a word included in the exclusion vocabulary and to be executed, the recognition result determiner:
reads the utterance duration data from the storage device, and
compares the read utterance duration data with the utterance duration information created by the voice acquirer to make a second determination whether to reject or execute the first information, based on the comparison.

2. The voice recognition processing apparatus according to claim 1, further comprising:
a second voice recognizer configured to convert the voice information into second information; and
a selector configured to select and output one of the first information and the second information,
wherein the recognition result determiner determines whether to reject or execute information selected by the selector.

3. The voice recognition processing apparatus according to claim 2, further comprising a transmitter-receiver configured to communicate with the second voice recognizer via a network,
wherein the second voice recognizer is installed on the network.

4. A voice recognition processing apparatus comprising:
a voice acquirer configured to acquire a voice uttered by a user and to output voice information;
a first voice recognizer configured to convert the voice information into first information;
a storage device that previously stores a dictionary in which an exclusion vocabulary is registered; and
a recognition result determiner that compares the first information with the exclusion vocabulary to determine whether the first information includes a word that agrees with a word included in the exclusion vocabulary, wherein the recognition result determiner:
determines that the first information is information to be rejected, when the first information includes the word that agrees with a word included in the exclusion vocabulary; and
determines that the first information is information to be executed, when the first information does not include the word that agrees with a word included in the exclusion vocabulary,
wherein
the voice acquirer measures lengths of silent periods that occur before and after an utterance of the user based on the acquired voice to create utterance form information,
the storage device previously stores utterance form data representing lengths of silent periods that occur before and after an utterance,
regarding the first information that is determined not to include the word that agrees with a word included in the exclusion vocabulary and to be executed, the recognition result determiner:
reads the utterance form data from the storage device, and
compares the read utterance form data with the utterance form information created by the voice acquirer to make a second determination whether to reject or execute the first information, based on the comparison.

5. A voice recognition processing method comprising:
acquiring a voice uttered by a user to convert the voice into voice information;
converting the voice information into first information;
converting the voice information into second information;
selecting one of the first information and the second information;
comparing the selected information with an exclusion vocabulary registered in a dictionary to determine whether the selected information includes a word that agrees with a word included in the exclusion vocabulary;
determining that the selected information is information to be rejected, when the selected information includes the word that agrees with a word included in the exclusion vocabulary;
determining that the selected information is information to be executed, when the selected information does not include the word that agrees with a word included in the exclusion vocabulary,
measuring a length of time uttered by the user based on the acquired voice to create utterance duration information,
previously storing utterance duration data representing a time required for an utterance,
regarding the selected information that is determined not to include the word that agrees with a word included in the exclusion vocabulary and to be executed, a recognition result determiner:
reads the utterance duration data from the storage device, and compares the read utterance duration data with the utterance duration information created by the voice acquirer to make a second determination whether to reject or execute the selected information, based on the comparison.

6. A display apparatus comprising:

a voice acquirer configured to acquire a voice uttered by a user and to output voice information;

a first voice recognizer configured to convert the voice information into first information;

a storage device that previously stores a dictionary in which an exclusion vocabulary is registered;

a recognition result determiner configured to compare the first information with the exclusion vocabulary, to determine whether the first information includes a word that agrees with a word included in the exclusion vocabulary, and, based on the determination, to determine whether to reject or execute the first information;

a processor configured to execute processing based on the first information that is determined by the recognition result determiner to be executed; and a display device, wherein the recognition result determiner:

determines that the first information is information to be rejected, when the first information includes the word that agrees with a word included in the exclusion vocabulary; and determines that the first information is information to be executed, when the first information does not include the word that agrees with a word included in the exclusion vocabulary, and wherein the voice acquirer measures a length of time uttered by the user based on the acquired voice to create utterance duration information, the storage device previously stores utterance duration data representing a time required for an utterance, regarding the first information that is determined not to include the word that agrees with a word included in the exclusion vocabulary and to be executed, the recognition result determiner:

reads the utterance duration data from the storage device, and compares the read utterance duration data with the utterance duration information created by the voice acquirer to make a second determination whether to reject or execute the first information, based on the comparison.

* * * * *